US012714953B2

(12) United States Patent
Lee et al.

(10) Patent No.: US 12,714,953 B2
(45) Date of Patent: Aug. 25, 2026

(54) BUBBLE TRAP WITH FLUID GUIDE

(71) Applicant: San Jose State University Research Foundation, San Jose, CA (US)

(72) Inventors: Sang-Joon Lee, San Jose, CA (US); Max Kim, San Jose, CA (US); Bhavagyna Vegunta, San Jose, CA (US); Anand Ramasubramanian, San Jose, CA (US); Charmaine Lui, San Jose, CA (US); Joshua Tran, San Jose, CA (US)

(73) Assignee: San Jose State University Research Foundation, San Jose, CA (US)

( * ) Notice: Subject to any disclaimer, the term of this patent is extended or adjusted under 35 U.S.C. 154(b) by 315 days.

(21) Appl. No.: 18/634,723

(22) Filed: Apr. 12, 2024

(65) Prior Publication Data

US 2025/0242279 A1 Jul. 31, 2025

Related U.S. Application Data

(60) Provisional application No. 63/626,373, filed on Jan. 29, 2024.

(51) Int. Cl.
*B01D 19/00* (2006.01)

(52) U.S. Cl.
CPC ..... *B01D 19/0068* (2013.01); *B01D 19/0042* (2013.01)

(58) Field of Classification Search
CPC ........................ B01D 19/0068; B01D 19/0042
(Continued)

(56) References Cited

U.S. PATENT DOCUMENTS 3,795,088 A * 3/1974 Esmond ................. B01D 29/05 96/182
3,996,027 A * 12/1976 Schnell ............... A61M 1/3627 210/512.1

(Continued)

FOREIGN PATENT DOCUMENTS

GB 2209129 A * 5/1989 ............ B01D 19/00

OTHER PUBLICATIONS

Meng, Dennis Desheng, et al., “A degassing plate with hydrophobic bubble capture and distributed venting for microfluidic devices”, (Jan. 19, 2006).

(Continued)

*Primary Examiner* — Frank M Lawrence, Jr.
(74) *Attorney, Agent, or Firm* — MLO, a professional corp.

(57) ABSTRACT

A bubble trap device is provided comprising: a housing including an inner wall region defining a chamber to enclose a fluid; a fluid guide; a first fluid conduit located within the fluid guide and extending between a first opening in the inner wall region and a first surface opening located in the first surface region; a second fluid conduit located within the fluid guide and extending between a second housing opening in the inner wall region and a second surface opening located in the second surface region; one or more third fluid conduits located at a perimeter region of the fluid guide and extending between the first chamber region and the second chamber region; wherein the fluid guide has a contour to direct fluid flowing between the first fluid conduit and the second fluid conduit to flow through one or more of the one or more third fluid conduits.

20 Claims, 10 Drawing Sheets

(58) Field of Classification Search
USPC ......... 96/155, 188, 189, 194, 197, 204, 220; 95/241
See application file for complete search history.

(56) References Cited

U.S. PATENT DOCUMENTS

| | | | | |
|---|---|---|---|---|
| 4,806,135 | A | 2/1989 | Siposs | |
| 5,674,199 | A * | 10/1997 | Brugger | A61M 1/3627 604/122 |
| 6,051,134 | A * | 4/2000 | Schnell | B01D 19/0031 96/204 |
| 7,279,031 | B1 * | 10/2007 | Wright | A61M 1/3627 96/197 |
| 8,202,357 | B2 | 6/2012 | Behruzi et al. | |
| 8,241,409 | B2 | 8/2012 | Arnold et al. | |
| 9,962,698 | B2 | 5/2018 | Ingber et al. | |
| 11,020,541 | B2 | 6/2021 | Fangrow et al. | |
| 2008/0171962 | A1 * | 7/2008 | Engelhardt | A61M 1/3627 604/122 |
| 2012/0265139 | A1 * | 10/2012 | Bryan | A61M 1/3627 604/122 |

OTHER PUBLICATIONS

Saghaei, Tayebeh, et al., “A microfluidic valve with bubble trap and zero dead volume”, (Jan. 20, 2022).

Zhao, Xiaoxiao, et al., “Air Bubble Removal: Wettability Contrast Enabled Microfluidic Interconnects”, (2022).

* cited by examiner 102
3
3
128
126
104
108
108
150
150
130
194
124
124

102
106, 106-1
106, 106-2
5
129
128
118
120
131
130
110
110-1
110-2
122
194
116
108
114
126
112
127
5

110
124
9
9
8
8
138
120
148
118
122
194
146
142
116
112
144
136
110-1
124
114
140

129
128
118
120
124, 124-1
110-1
124, 124-2
106
136
108
122
108
194
502-1
502-1
116
108
150, 150-1
136
112
106
150, 150-2
108
126
114
127

BUBBLE TRAP WITH FLUID GUIDE

CROSS-REFERENCE TO RELATED APPLICATION

This patent application claims the benefit of U.S. Provisional Patent Application No. 63/626,373, filed Jan. 29, 2024, entitled "BUBBLE TRAP WITH FLUID GUIDE", which is incorporated by reference herein in its entirety.

BACKGROUND

In many systems that pump liquid through conduits (e.g., plastic tubing), the liquid may contain dissolved gas. For a variety of reasons (e.g., temperature changes, agitation, gas diffusion, chemical reactions, wall-surface interactions, or otherwise) gas bubbles may form, even if initially removed by known methods (e.g., vacuum degassing). Gas bubbles can be detrimental to important applications such as medical interventions (e.g., dialysis machines) and biological cell experiments in microchannels. Although one effective strategy for removing gas bubbles is to use an intermediate reservoir that has an open-to-air surface, such a method can result in spillage if the reservoir is tilted or jostled.

U.S. Pat. No. 11,020,541, invented by Fangrow et al., discloses a bubble trap having an enclosed fluid chamber, an inlet conduit, and an outlet conduit that project into the chamber for fluid inflow and fluid outflow. The inlet and outlet conduits can be positioned so that the opening to the chamber for each is located at or near the center of the chamber so that their center axes are offset from one another to reduce the chance that a gas bubbles emerging from the inlet conduit flowing into the outlet conduit. The inlet and outlet conduits may be misaligned to break up a fluid pathway between openings to the conduits, thereby causing gas bubbles to come to rest along a periphery of the chamber.

Nevertheless, there remains a need for robust bubble trap performance that remains viable in a wide range of operating conditions, which may include a wide range of flow rates, gas bubble sizes, and/or device orientations. It is desirable to have a robust bubble trap that prevents the passage of air bubbles even for highly unsteady flow conditions or for mobile platforms on which the orientation of the bubble trap may change abruptly.

SUMMARY

In one aspect, a bubble trap device is provided that includes a housing with an inner wall region that defines a chamber to enclose a fluid. A fluid guide includes a first surface region and a second surface region that face in opposite directions from one another. The fluid guide also includes a perimeter region that substantially extends about the first surface region and the second surface region. The fluid guide is arranged within the chamber to separate the chamber into a first chamber region and a second chamber region such that the first surface region faces the first chamber region, and the second surface region faces the second chamber region. A first fluid conduit is located between the first and second surface regions and extends between a first opening in the inner wall region and a first surface opening located in the first surface region. A second fluid conduit is located between the first and second surface regions and extends between a second housing opening in the inner wall region and a second surface opening located in the second surface region. One or more third fluid conduits are located at the perimeter region and extend between the first chamber region and the second chamber region. The fluid guide has a contour to direct fluid flowing between the first fluid conduit and the second fluid conduit to flow through one or more of the one or more third fluid conduits.

In another aspect, a bubble trap device is provided that includes a housing that includes an inner wall region defining a chamber to enclose a fluid. A fluid guide includes a first surface region and a second surface region that face in opposite directions from one another. The fluid guide also includes a perimeter region. The fluid guide is arranged within the chamber to separate the chamber into a first chamber region and a second chamber region with the first surface region facing the first chamber region and the second surface region facing the second chamber region and with the perimeter region spaced apart from the inner wall region. A first fluid conduit is located between the first and second surface regions and extends between a first opening in the inner wall region and a first surface opening located in the first surface region. A second fluid conduit is located between the first and second surface regions and extends between a second housing opening in the inner wall region and a second surface opening located in the second surface region. One or more third fluid conduits are located at one or more locations of the perimeter region to allow flow of fluid between the first chamber region and the second chamber region for substantially all orientations of the bubble trap device relative to a reverse gravitational direction, for fluid that flows into one or the other of the first chamber region or the second chamber region through a corresponding one or the other of the first surface opening or the second surface opening and that flows along a corresponding one or the other of the first surface region or the second surface region in the reverse gravitational direction.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for simplicity and clarity and does not in itself dictate a relationship between the various embodiments and/or configurations discussed.

DETAILED DESCRIPTION

Figure 1:
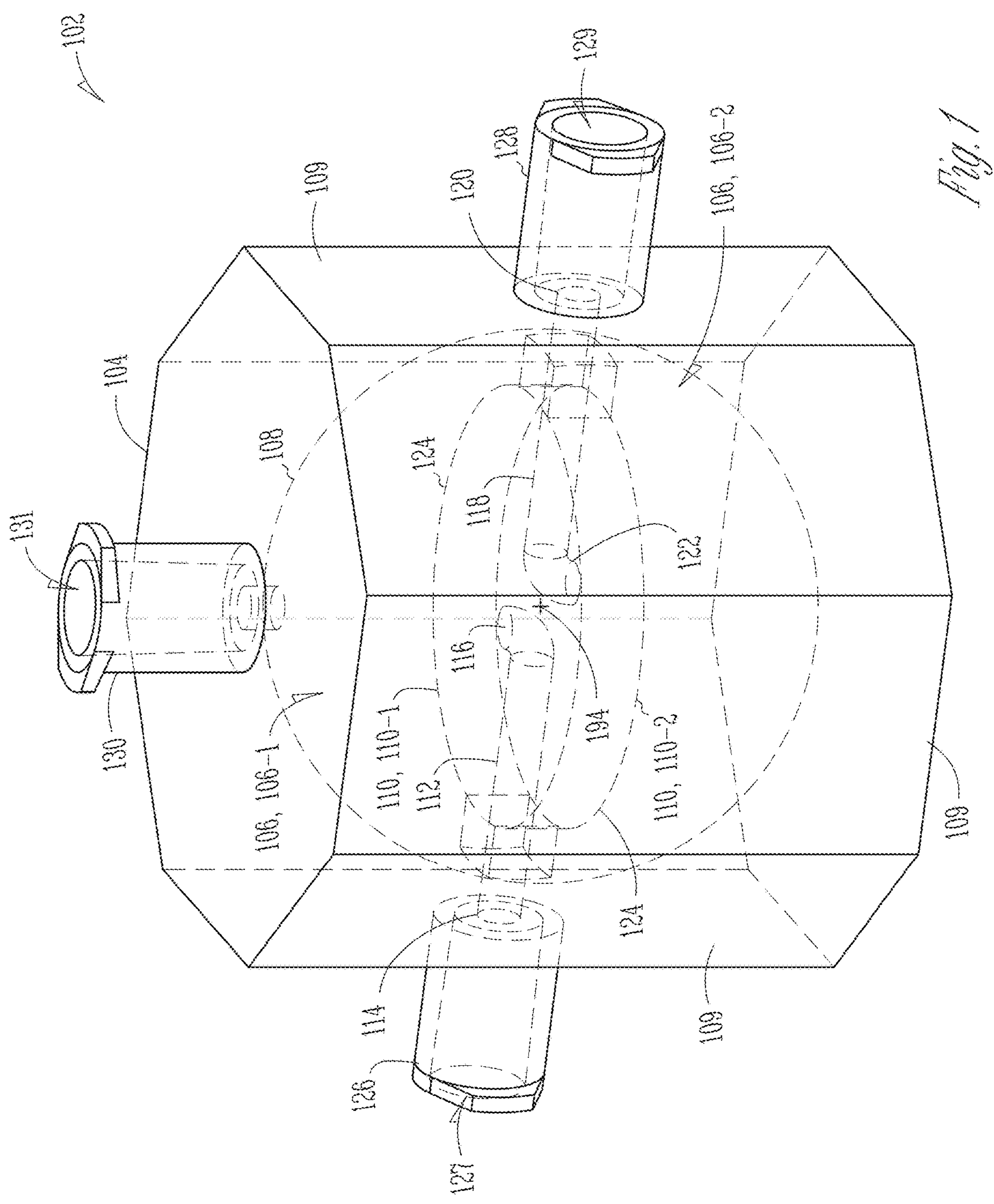
FIG. 1 is an illustrative drawing showing a partially transparent perspective view of a bubble trap device in accordance with some embodiments.

FIG. 1 is an illustrative drawing showing a partially transparent perspective view of a bubble trap device 102 in accordance with some embodiments. The bubble trap device 102 includes a housing 104 that defines a generally spherical-shaped interior chamber 106 suitable to contain a fluid. A fluid may comprise a combination of liquid phase material and gas phase material (e.g., bubbles). In some embodiments, the housing 104 includes inner wall region 108 (indicated by dashed lines) that defines a spherically shaped interior chamber 106. The inner wall region 108 that defines the chamber 106 and other structures defined within the housing 104 are indicated by dashed lines. An example housing 104 comprises unitary structure that defines the integral interior structures described below and that can be manufactured as a unit from a substantially rigid material such as polycarbonate, polyetheretherketone (PEEK), polymethyl methacrylate (PMMA), polypropylene, polyethylene terephthalate (PET), and other materials, using well-known 3D printing manufacturing techniques. An example housing 104 includes a hexagonal-shaped perimeter region 109.

A fluid guide 110 (indicated by dashed lines) is secured to the inner wall region 108. The fluid guide includes a first surface region 110-1 and a second surface region 110-2 that face away from one another. The first and second surface regions 110-1, 110-2 are shown in cross-section in FIGS. 3, 8, 9. Example first and second surface regions 110-1, 110-2 are generally planar. An example fluid guide 110 is arranged within the chamber 106 to divide the chamber 106 into a first chamber portion 106-1 and a second chamber portion 106-2. An example fluid guide 110 defines a first conduit 112 (indicated by dashed lines) located between the first and second surface regions 110-1, 110-2, that extends between a first housing opening 114 in the inner wall 108 and a first inner surface opening 116 in the first surface region 110-1 providing a fluid opening into the first chamber portion 106-1. An example fluid guide 110 defines a second conduit 118 (indicated by dashed lines) located between the first and second surface regions 110-1, 110-2, that extends between a second housing opening 120 in the inner wall 108 and a second inner surface opening 122 in the second surface region 110-2 providing a fluid opening into the second chamber portion 106-2. An example fluid guide 110 includes peripheral region 124 at outer edges of and extending between the first and second surface regions 110-1, 110-2.

As stated above, an example fluid guide 110 is arranged within the chamber 106 to divide the chamber 106 into a first chamber portion 106-1 and a second chamber portion 106-2. The first surface region 110-1 faces the first chamber portion 106-1. The second surface region 110-2 faces the second chamber portion 106-2. An example fluid guide 110 is further arranged within the chamber 106 such that the outer perimeter region 124 of the fluid guide 110 is spaced apart from the inner wall region 108 of the chamber 106 to provide a third conduit 150 (not visible in this drawing), explained more fully below with reference to FIGS. 4, 5, 8, 9, between the perimeter region 124 and the inner wall region 108. An example fluid guide 110 has a generally circular-shaped perimeter region 124 and is arranged within the chamber 106 to provide a substantially constant gap distance to define the third conduit 150 located between the perimeter region 124 and the inner wall region 108 of the chamber 106. An example third conduit 150, which is defined in part by the perimeter region 124 of the fluid guide 110 and in part by the inner wall region 108 of the chamber 106, acts as a third fluid conduit that extends between the first cavity region 106-1 and the second cavity region 106-2.

An example first external coupler 126 defining a first external fluid conduit portion 127 is connected to the outer surface region 109 of the housing 104 to provide external fluid access to the first housing opening 114. An external tube or syringe (not shown) can be coupled to the first external coupler 126 to provide a fluid path between the tube or syringe and the first conduit 112. Similarly, an example second external coupler 128 defining a second external fluid conduit portion 129 is connected to the outer surface region 109 of the housing 104 to provide external fluid access to the second housing opening 120. An external tube or syringe (not shown) can be coupled to the second external coupler 128 to provide a fluid path between the tube or syringe and the second conduit 118. Example first and second external couplers 126, 128 can be integrally formed with the housing 104 and can comprise a barb, luer, conical ferrule, or other suitable, fluid channel connectors.

A scalable fluid access port 130 defining a third fluid conduit portion 131 is provided to the outer surface 109 of the housing to provide fluid access to the chamber 106 for use to add fluid to or to remove fluid from the chamber 106. As explained more fully below, it is contemplated that prior to use, the chamber 106 ordinarily is at least partially pre-filled with the type of fluid that is to flow into and out of the chamber 106 via the first and second conduits 112, 118. The scalable access port 130 can be sealed with a cap (not shown) during use of the bubble trap device 102 while fluid flows between the first and second conduits 112, 118. Furthermore, the port 130 can be used for interventions such as regulating the internal pressure and/or adjusting the fractional amounts of liquid and gas within the chamber 106.

Figure 2:
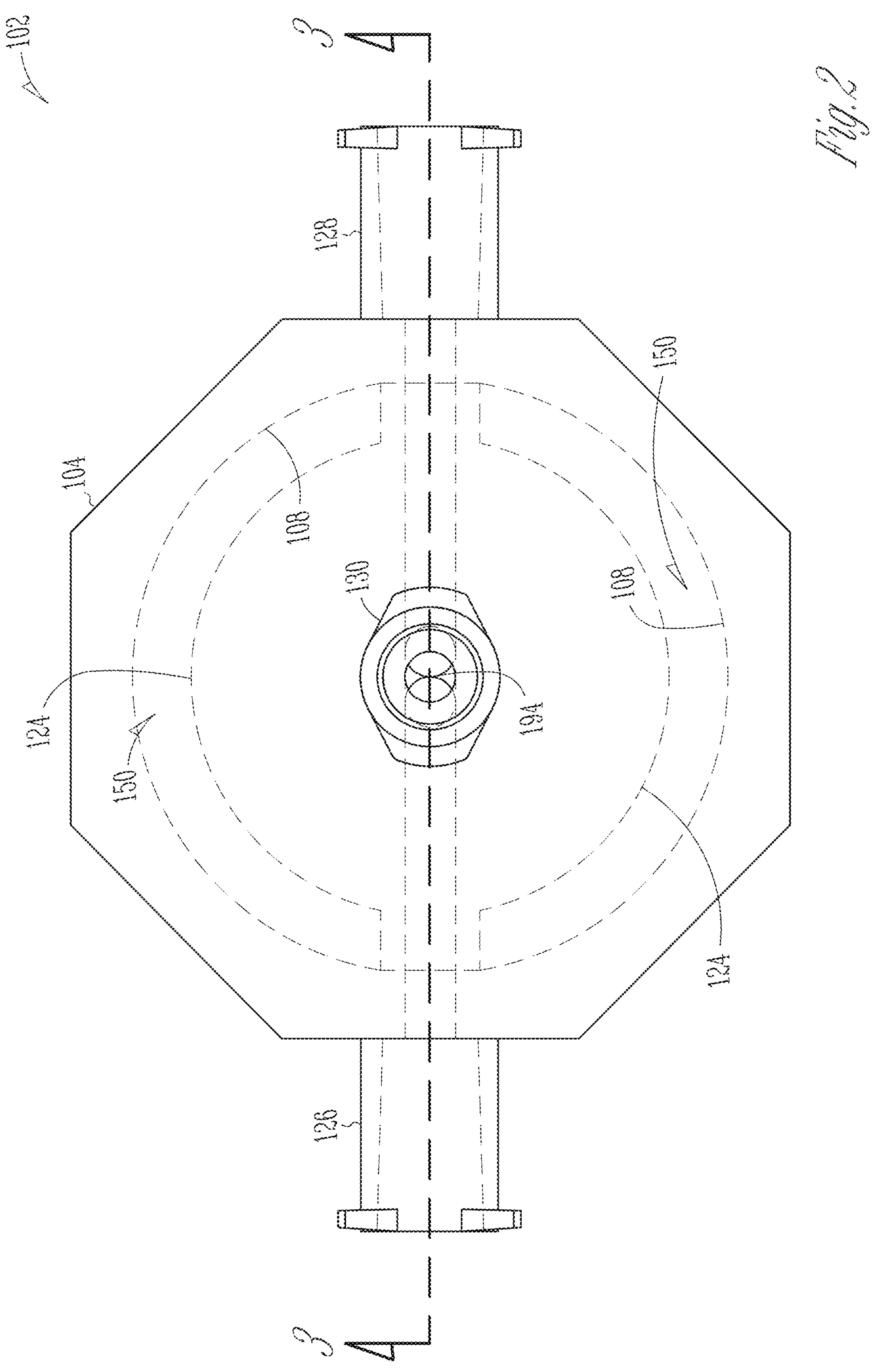
FIG. 2 is an illustrative partially transparent a top view of the device of FIG. 1.

FIG. 2 is an illustrative partially transparent a top view of the device 102 of FIG. 1. Example first and second external couplers 126, 128 are shown connected to and providing fluid access at opposite sides of the housing 104. An example scalable fluid access port 130 is shown located at an end portion of the housing 104. The fluid guide 110 (indicated by dashed lines) and the inner wall 108 (indicated by dashed lines) of the chamber 106 define the third conduit 150, which comprises an opening between them. It will be appreciated that the terms top, end, and sides are for convenience in identifying the relative locations of components and is not intended to signify their position with respect to ground, for example. In use, the orientation of the device 102 may vary and the use of these terms is not intended to require any particular orientation of the device 102.

Figure 3:
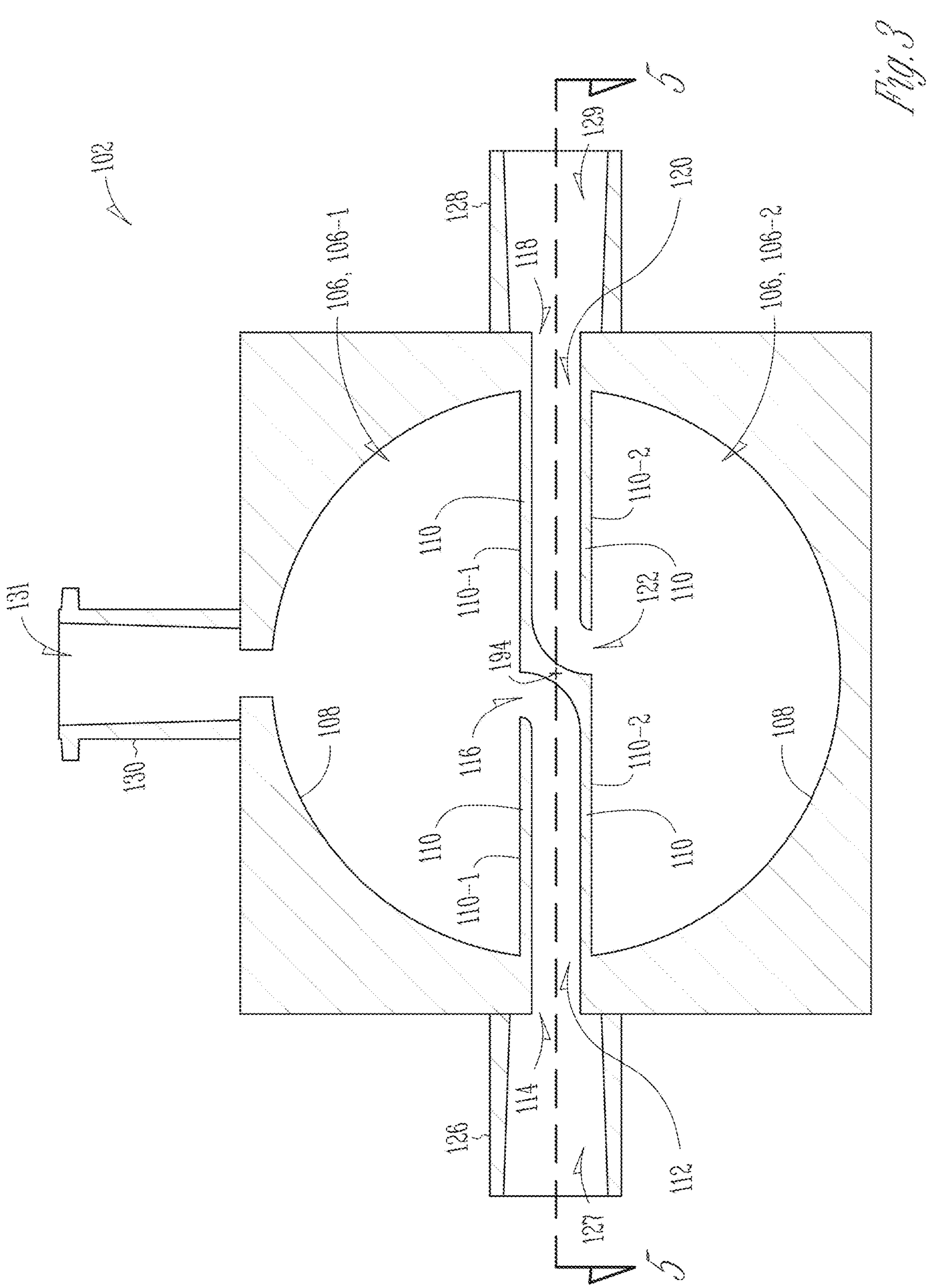
FIG. 3 is an illustrative cross section view of the device viewed along line 3-3 of FIG. 2.

FIG. 3 is an illustrative cross section view of the device 102 viewed along line 3-3 of FIG. 2. The housing 104 includes the inner wall region 108 that defines a chamber 106 that includes a first chamber portion 106-1 and a second chamber portion 106-2 that are separated from one another by the fluid guide 110. An example fluid guide 110 extends within the chamber 106 between the first and second external couplers 126, 128. The fluid guide 110 includes the first surface region 110-1 and a second surface region 110-2 that face in opposite directions from one another. The first surface region 110-1 faces the first chamber portion 106-1. The second surface region 110-2 faces the second chamber portion 106-2. If beneficial for additional mechanical integrity, internal scaffolding or support structures (not shown) can be added to secure the fluid guide 110 in a fixed position within the chamber 106. It would be readily apparent to anyone skilled in the art that internal supports can be integrated during 3D printing manufacturing of the device 102, for example. The first conduit 112 extends within the fluid guide 110 between a first housing opening 114 and a first inner surface opening 116. The first housing opening 114 provides an opening in the housing 114 and opens into the first external coupler 126. The first inner surface opening 116 opens into the first chamber region 106-1 of the overall chamber 106 at the first surface region 110-1 of the fluid guide 110. The second conduit 118 extends within the fluid guide 110 between a second housing opening 120 and a second inner surface opening 122. The second housing opening 120 provides an opening in the housing 114 and opens into the second external coupler 128. The second inner surface opening 122 opens into the second chamber region 106-2 of the overall chamber 106 at the second surface 110-2 of the fluid guide 110.

Figure 4:
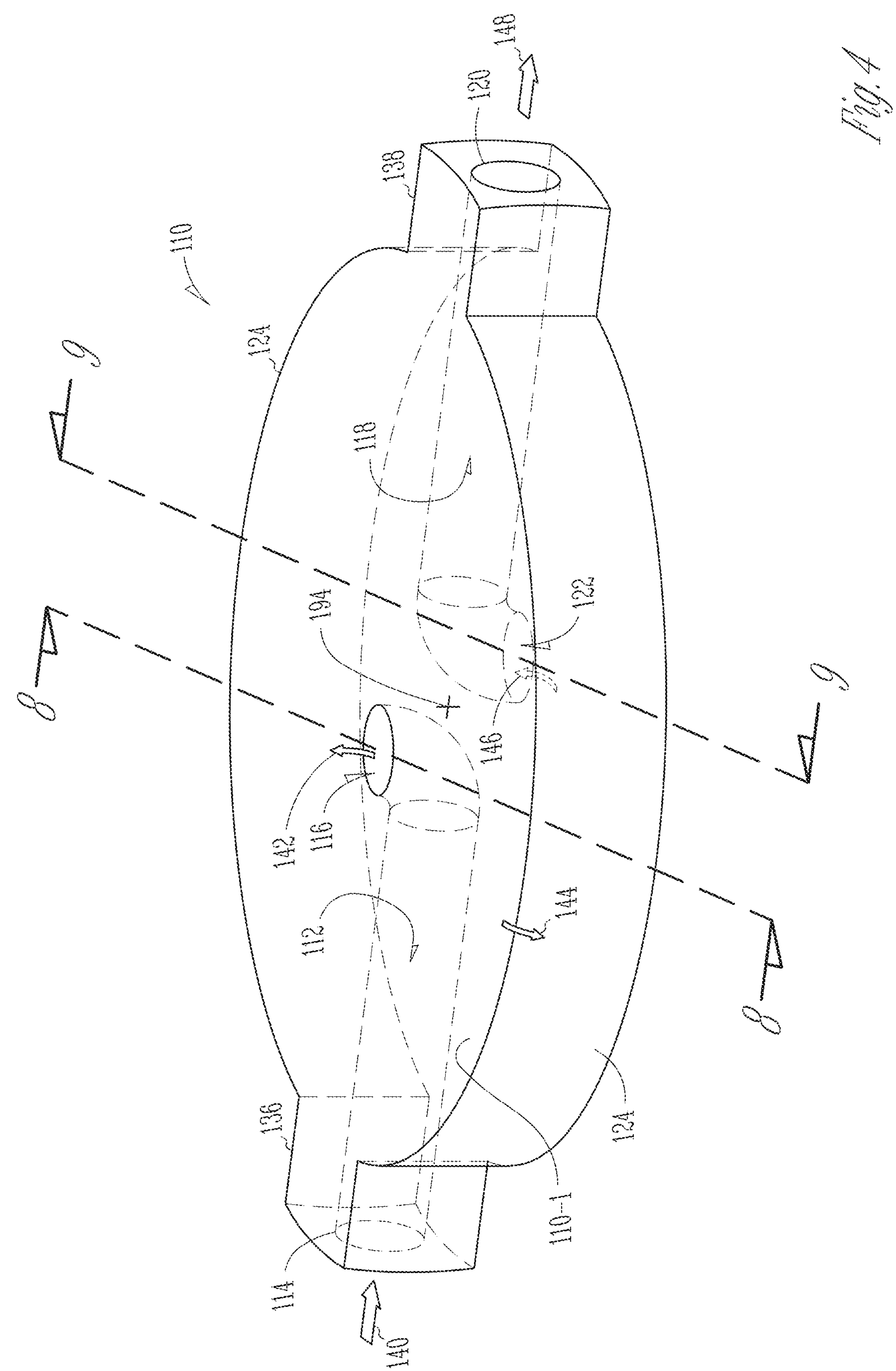
FIG. 4 is an illustrative partially transparent isolated perspective view of an example fluid guide of the device of FIG. 1.

FIG. 4 is an illustrative partially transparent isolated perspective view of an example fluid guide 110 of the device 102 of FIG. 1 in accordance with some embodiments. It will be understood that the fluid guide 110 is an integral portion of the device 102. The fluid guide 110 is shown in isolation in FIG. 4 to simplify the description of the fluid guide 110 by omitting from the drawing details that are not necessary for its description. An example fluid guide 110 includes the first surface region 110-1 and the opposite-facing second surface (not visible) 110-2. An example fluid guide 110 includes a perimeter region 124 that circumferentially surrounds the first and second surfaces 110-1, 110-2. In an example fluid guide 110, the first and second surface regions 110-1, 110-2 are contiguous with the perimeter region 124—they are substantially surrounded by a common outer perimeter region 124 and also have matching surface areas. In an example device 102, the first and second surface regions have substantially circular-shaped perimeter region 124, which interrupted by the spoke-like conduit structures 136, 138. The fluid guide 110 includes first and second spoke-like integral conduit structures 136, 138 that extend between a portion of the perimeter region 124 and a portion of the inner wall region 108 (not shown in this drawing). An example first spoke-like conduit structure 136 defines therein the first housing opening 114 and a portion of the first conduit 112 (indicated by dashed lines). An example second spoke-like conduit structure 138 defines therein the second housing opening 120 and a portion of the second conduit 118 (indicated by dashed lines). In addition to providing portions of the first and second conduits 112, 118, the example first and second spoke-like conduit structures 136, 138 help to fixedly secure the fluid guide 110 in place within the chamber 106. The example first inner surface opening 116 is shown formed in the first surface region 110-1. The example second inner surface opening 122 is formed in the second surface region 110-2 (not visible in this drawing).

FIG. 4 also provides an illustrative drawing representing a direction of fluid flow within the example fluid guide 110. A first arrow 140 represents fluid flowing into the first conduit 112 through the first housing opening 114. A second arrow 142 represents the fluid flowing out of the first conduit and into the first chamber region 106-1 through the first surface opening 116 formed in the first surface region 110-1 within the first chamber region 106-1 (not visible in this drawing). A third arrow 144 represents fluid flowing through the third conduit 150 (not visible in this drawing), explained below with reference to FIGS. 5-6, from the first chamber region 106-1 to the second chamber region 106-2 (not visible in this drawing). A fourth arrow 146 represents the fluid flowing into the second conduit 118 through the second surface opening 122 formed in the second surface region 110-2 within the second chamber region 106-2. A fourth arrow 148 represents the fluid flowing out of the second conduit 118 through the second housing opening 120. Thus, it will be understood that the fluid exits the first conduit 112 and enters the first chamber region 106-1 through the first inner surface opening 116 at the first surface region 110-1, flows through the third conduit 150 (not shown) between the perimeter region 134 and the inner wall 108 (not shown) from the first chamber region 106-1 (not shown) to the second chamber region 106-2 (not shown), and exits the second chamber region 106-2 and enters the second conduit 118 through the second inner surface opening 122 at the second chamber surface region 110-2 (not shown).

It will be understood that, alternatively, fluid can flow in a direction opposite to that shown by the arrows in FIG. 4. For example, alternatively, fluid can flow into the second conduit 118 through the second housing opening 120. The fluid can flow out of the second conduit 118 through the second inner surface opening 122 formed in the second surface region 110-2 within the second chamber region 106-2 (not shown). The fluid can flow through the third conduit 150 (not shown) between the perimeter region 134 and the inner wall 108 (not shown) from the second chamber region 106-2 to the first chamber region 106-1. The fluid can flow into the first conduit 112 through the first inner surface opening 116 formed in the first surface region 110-1. The fluid can flow out of the first conduit 112 through the first housing opening 114. The reverse fluid flow is not shown but will be readily understood from the explanation of current flow in FIG. 4.

Figure 5:
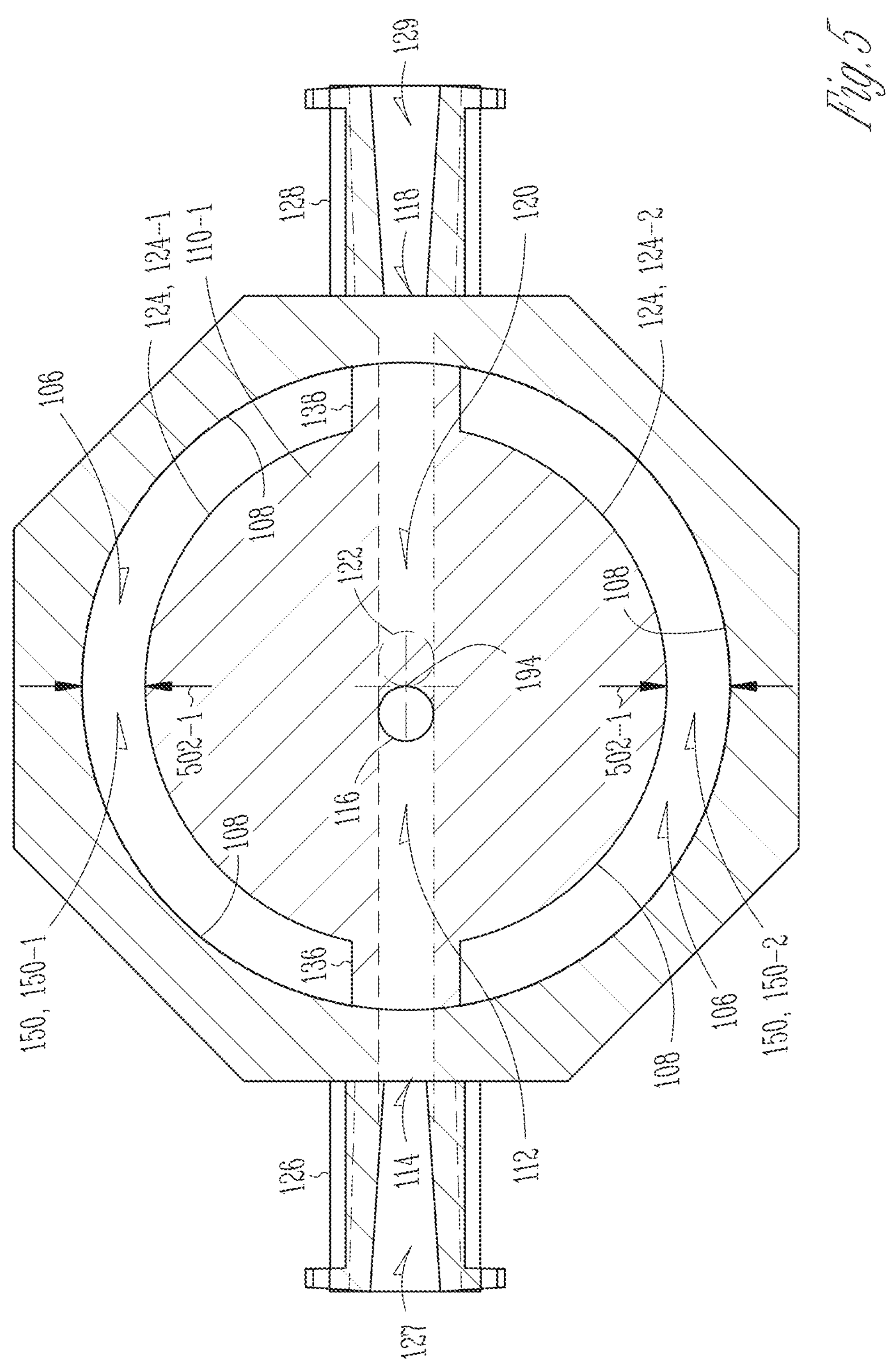
FIG. 5 is an illustrative top elevation horizontal cross-sectional view along line 5-5 in FIG. 3.

FIG. 5 is an illustrative a partially transparent top elevation horizontal cross-sectional view along line 5-5 in FIG. 3. FIG. 5 shows a transverse cut view through the fluid guide 110 of the bubble trap device 102. The fluid guide 110 includes the first and second integral conduit structures 136, 138, which are integrally secured to the inner wall 108 of the chamber 106 to suspend the fluid guide 110 within the chamber 106. The fluid guide 110 has a diameter dimension that is less than a diameter dimension of the chamber 106 such that first and second gaps indicated by arrows 502-1, 502-2 between the perimeter region 124 of the fluid guide 110 and the inner wall 108 of the chamber 106 define a third conduit 150 between the first and second chamber regions 106-1, 106-2. It will be appreciated that the third conduit comprises a portion of the inner chamber 106 located between the inner wall region 108 and the perimeter region 124 of the fluid guide 110. The first and second integral conduit structures 136, 138 divide the third conduit 150 into a left (first) third conduit portion 150-1, which is includes the first gap 502-1, and a right (second) third conduit portion 150-2, which includes the second gap 502-2. The right portion 150-1 and the left portion 150-2 of the third conduit 150 are separated from one another by the first and second integral conduit structures 136, 138. More specifically, a first outer perimeter region portion 124-1 of the outer perimeter region 124, in combination with the first and second first and second integral conduit structures 136, 138 define left (first) third conduit portion 150-1. Moreover, a second outer perimeter region portion 124-2 of the outer perimeter region 124, in combination with the first and second first and second integral conduit structures 136, 138 define right (second) third conduit portion 150-2. As explained more fully below, fluid may flow between the first and second inner surface openings 116, 122, through the right third conduit region 150-1 or through the left third conduit region 150-2 depending upon the orientation of the device 102. It will be appreciated that the terms right and left are for convenience in identifying the relative locations of components and are not intended to signify their position with respect to ground, for example. In use, the orientation of the device 102 may vary and the use of these terms is not intended to require any particular orientation of the device 102.

The first conduit 112, is shown (with dashed lines), that extends between the first housing opening 114, which is in fluid communication with the first external fluid conduit portion 127, and the first inner surface opening 116 through the first surface region 110-1. The second conduit 120, is shown (with dashed lines), that extends between the second housing opening 118, which is in fluid communication with the second external fluid conduit portion 129, and the second inner surface opening 122 through the second surface region 110-2 (not visible).

An example fluid guide 110 separates the chamber 106 into first and second chamber regions 106-1, 106-2. A first surface region 110-1 faces the first chamber region 106-1. A second surface region 110-2 faces the second chamber region 106-2. The first and second surface regions 110-1, 110-2 are impervious to fluid flow; they block fluid flow from flowing directly between the first and second chamber regions 106-1, 106-2. Instead, fluid must flow through the third conduit 150 in order to pass between the first and second chamber regions 106-1, 106-2. Similarly, the first and second surface regions 110-1, 110-2 are impervious to gas bubbles flowing through them; they block gas bubbles from flowing directly between the first and second chamber regions 106-1, 106-2. Instead, fluid must flow through the third conduit 150 in order to pass between the first and second chamber regions 106-1, 106-2. The inner wall 108 of the chamber 106 and the outer perimeter region 124 of the fluid guide 110 are arranged to define first and second gaps 502-1, 502-2 to provide the right third conduit region 150-1 and the left third conduit region 150-2 of the third conduit 150, that provide fluid communication between the first and second chamber regions 106-1, 106-2.

The third conduit 150 is spaced apart from the first surface opening 116 such that fluid or gas bubbles exiting the first surface opening 116 must flow across at least a portion of the first surface region 110-1 that is located between the first surface opening 116 and the perimeter region 124, where the third conduit 150 is located, before flowing from the first chamber region 106-1 to the second chamber region 106-2. Conversely, the third conduit 150 is spaced apart from the second surface opening 122 such that fluid or gas bubbles exiting the second surface opening 122 must flow across at least a portion of the second surface region 110-2 that is located between the second surface opening 122 and the perimeter region 124, where the third conduit 150 is located, before flowing from the second chamber region 106-2 to the first chamber region 106-1.

Figure 6:
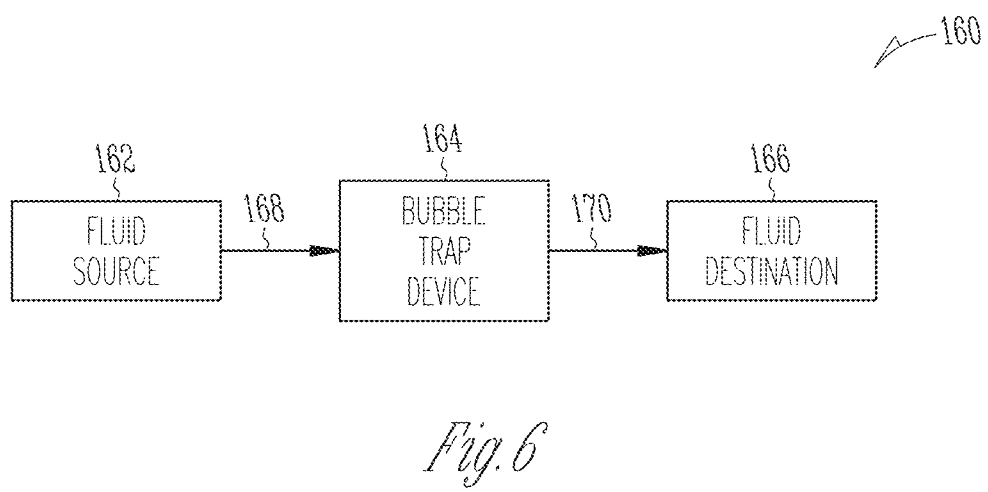
FIG. 6 is an illustrative schematic diagram of an example first fluid transfer system.

FIG. 6 is an illustrative schematic representation of an example first fluid transfer system 160. The first fluid transfer system 160 includes a fluid source 162, a bubble trap device, 164 and a fluid destination 166 (e.g., a cell culture well or chemical reaction chamber) A first fluid conduit 168 is operatively coupled between the fluid source 162 and the bubble trap device 164. A second fluid conduit 170 is operatively coupled between the bubble trap device 164 and the fluid destination 166. The fluid source container 162 may include a syringe pump or a pressurized reservoir, for example, that impels fluid to flow from the fluid source 162, through the bubble trap 164, to the fluid destination 166. The bubble trap 164 is operatively coupled between the fluid source 162 and the fluid destination 166 to remove gas bubbles before the fluid is delivered to the fluid destination 166. As another embodiment of the system, the fluid destination may draw fluid from the source by negative pressure using a vacuum reservoir or withdrawal syringe, for example.

Figure 7:
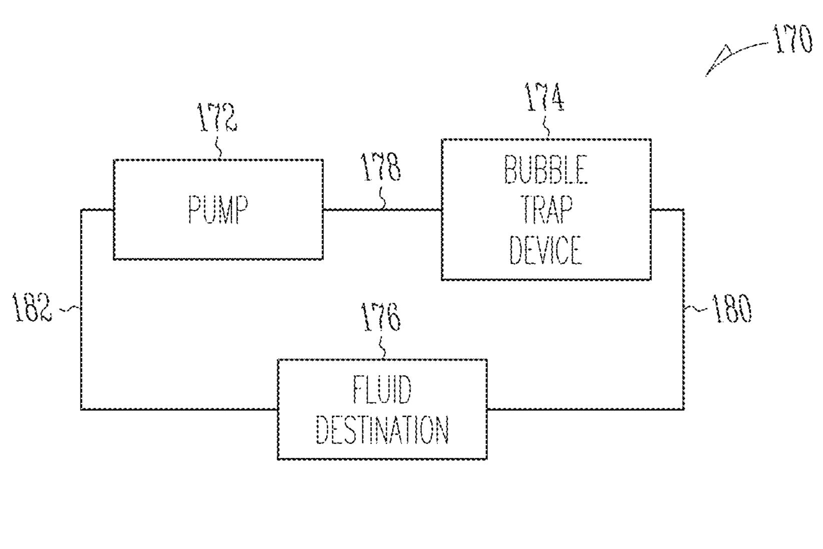
FIG. 7 is an illustrative schematic diagram of an example second fluid transfer system.

FIG. 7 is an illustrative schematic representation of an example second fluid transfer system 170. The second fluid transfer system 170 includes a pump 172 (e.g., peristaltic pump, electroosmotic pump, or otherwise), a bubble trap device, 174 and a fluid destination 176. A first fluid conduit 178 is operatively coupled between the pump 172 and the bubble trap device 174. A second fluid conduit 180 is operatively coupled between the bubble trap device 174 and the fluid destination 176. A third fluid conduit 182 is operatively coupled between the fluid destination 176 and the pump 172. The pump 172 impels fluid to flow in a fluidic circuit through the bubble trap 174, the fluid destination 176 and back to the pump 122. The bubble trap 174 is operatively coupled between the pump 172 and the fluid destination 176 to remove gas bubbles from the fluid transfer system 170.

Figure 8:
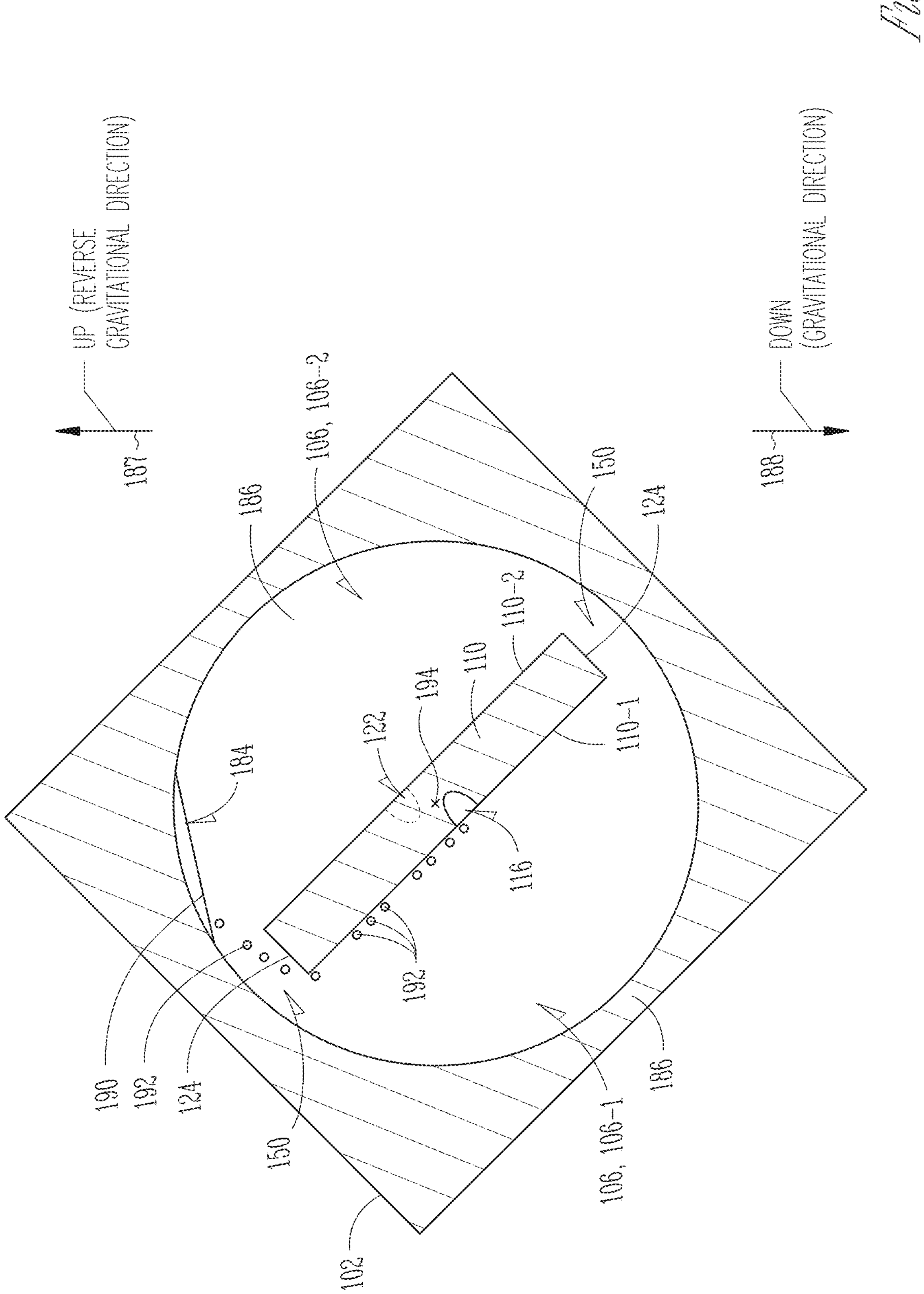
FIG. 8 is an illustrative partially transparent cross-section view along line 8-8 in FIG. 4 showing the device oriented with the first surface region facing generally away from a gas reservoir location within the chamber.

FIG. 8 is an illustrative partially transparent cross-section view of the device 102 along line 8-8 in FIG. 4 showing the device 102 oriented with the fluid guide 110 inclined at a first angle relative to reverse gravitational direction 187 and with the first surface region 110-1 facing generally away from a gas accumulation location 184 within the chamber 106. The example chamber 106 as shown in FIG. 8 is at least partially filled with a fluid that is predominantly in a liquid phase 186. It will be appreciated that due to buoyancy of gas bubbles, the bubbles naturally attempt to float upwardly within the fluid 186 in a reverse gravitational direction, toward the gas accumulation location 184. Arrow 187 shows reverse gravitational direction, which is upward. Arrow 188 shows gravity direction, which is downward. As referred to herein, the 'gas accumulation location' 184 is a location where fluid can be liquid or gas or combination thereof and at which bubbles naturally tend to coalesce into a continuous gas phase. The gas accumulation location 184 generally is the physical highest level location with respect to gravity acting downward within the chamber 106. Boundary line 190 represents a gas-fluid interface between the gas within the gas accumulation location 184 within the chamber 106 and the fluid 186 within the chamber 106.

Still referring to FIG. 8, during example fluid flow within the fluid guide 110 in direction shown by the arrows in FIG. 4, such that fluid exits through the first surface opening 116 in the first surface region 110-1. During the fluid flow out of the first surface opening 116, bubbles 192 also may exit the first opening 116. Due to bubble buoyancy, the bubbles 192 will attempt to float upwardly toward the gas reservoir location 184. However, the first surface region 110-1 blocks a direct ascent from the first surface opening 116 to the gas reservoir location 184. Instead, the first surface region 110-1 guides the bubbles 192 to the third fluid conduit 150 located between the inner wall 108 and the perimeter region 124 of the fluid guide 110. More particularly, the bubbles naturally attempt to flow upwardly, but the first surface 110-1 of the fluid guide 110 guides the bubbles 192, which are naturally attempting to float upwards, along its surface to a portion of the third conduit 150 that is at a physical height-level that is greater than a physical height-level of the second surface opening 122 (shown with dashed lines since it is not in the 8-8 viewing plane) formed in the second surface 110-2. More particularly, in this example, the bubbles are guided by the first surface 110-1 in which the first surface opening 116 is formed, to move in a reverse gravitational to a portion of the third conduit 150 located at or near the physically highest point of the fluid guide 110 in the chamber 106, toward the accumulation location 184. As a result, in this example, due to gravity and buoyancy, bubbles that flow through the third conduit 150 from the first chamber region 106-1 to the second chamber region 106-2 naturally flow upwardly toward the gas reservoir location 184 where they can be captured, and away from the second surface opening 122. Moreover, gas bubbles 192 may coalesce at a portion of the inner wall 108 near a portion of the third conduit 150 where the gas bubbles flow from the first chamber region 106-1 to the second chamber region 106-2.

Figure 9:
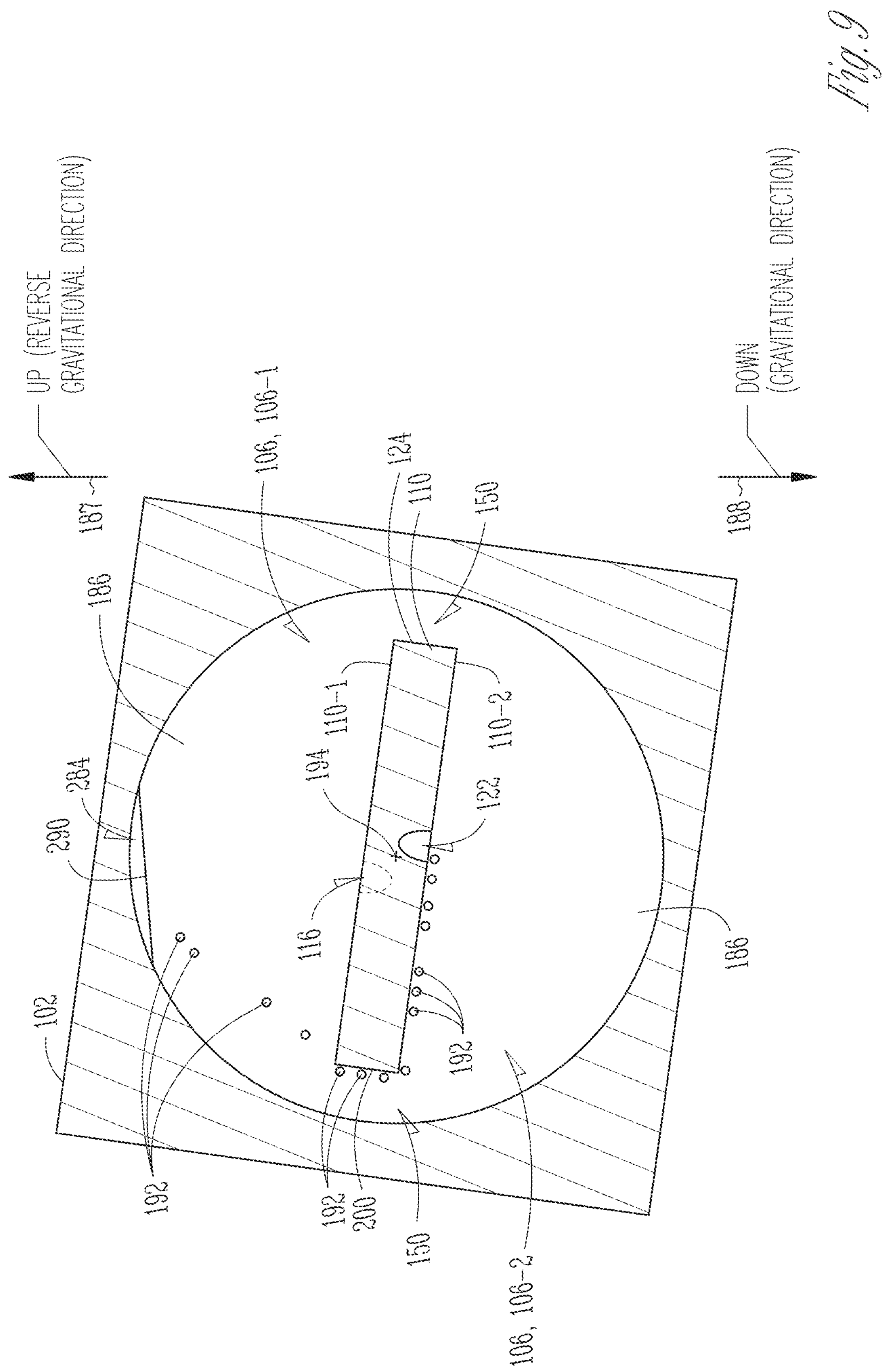
FIG. 9 is an illustrative partially transparent cross-section view along line 9-9 in FIG. 4 showing the device oriented with the second surface region facing generally away from a gas reservoir location within the chamber.

FIG. 9 is an illustrative cross-section view of a device 102 along line 9-9 in FIG. 4 showing the device 102 oriented with the fluid guide 110 inclined at a second angle relative to the reverse gravitational direction 187 and with the second surface region 110-2 facing generally away from a gas reservoir location 284 within the chamber 106. It is noted that FIG. 8 and FIG. 9 show the fluid guide 110 arranged at different example orientations relative to the reverse gravitational direction 187. The example chamber 106 as shown in FIG. 9 is at least partially filled with a fluid 186 that is predominantly in liquid phase. The fluid 186 is filled such that the second surface opening 122 is fully immersed therein. As explained above, due to buoyancy of gas bubbles, the bubbles naturally attempt to float upwardly within the fluid 186 in a reverse gravitational direction, toward the gas reservoir location 284. Boundary line 290 represents a gas-fluid interface between the gas within the gas reservoir location 284 within the chamber 106 and the fluid 186 within the chamber.

Still referring to FIG. 9, during example fluid flow within the fluid guide 110 in reverse direction shown by the arrows in FIG. 4, such that fluid exits through the second surface opening 122 in the second surface region 110-2. During the fluid flow out of the second surface opening 122, bubbles 192 also may exit the second opening 122. Due to bubble buoyancy, the bubbles 192 will attempt to float upwardly toward the gas reservoir location 184. However, the second surface region 110-2 blocks a direct ascent from the second surface opening 122 to the gas reservoir location 184. Instead, the second surface region 110-2 guides the bubbles 192 to the third fluid conduit 150 located between the inner wall 108 of the chamber 106 and the perimeter region 124 of the fluid guide 110. More particularly, an example second surface 110-2 of the fluid guide 110 guides the bubbles 192, which are naturally attempting to flow upward, along its surface to a portion of the third conduit 150 that is at a physical height-level that is greater than a physical height-level of the first surface opening 116 (shown with dashed lines since it is not in the 9-9 viewing plane) formed in the first surface 110-1. More particularly, in this example, the bubbles are guided by the second surface 110-2 in which the second surface opening 122 is formed, to move in a reverse gravitational direction to a portion of the third conduit 150 located at or near the physically highest point of the fluid guide 110 within the chamber 106, toward the accumulation location 184. As a result, in this example, due to gravity and buoyancy, bubbles that flow through the third conduit 150 from the second chamber region 106-2 to the first chamber region 106-1 naturally flow upwardly toward the gas reservoir location 284 where they can be captured, and away from the first surface opening 116. Moreover, gas bubbles 192 may coalesce at a portion of the inner wall 108 near a portion of the third conduit 150 where the gas bubbles flow from the second chamber region 106-2 to the first chamber region 106-1.

It will be appreciated that the bubble device is orientation independent. Since the chamber is sealed during use, there is no requirement to maintain an orientation to avoid fluid spillage. Moreover, the third conduit 150 extends about substantially the entire perimeter 124 of the fluid guide 110 such that if can provide a fluid passage between first and second chamber portions 106-1, 106-2 regardless of orientation of the device 102. Gas bubbles will naturally float toward whatever portion of the third conduit is at the greatest height level regardless of device orientation.

Additionally, provided that sufficient fluid 186 is contained within the chamber 106 that the first and second surface openings 116, 122 are always submerged in fluid at all orientations of the device 102, the device 102 can be bidirectional, e.g., can is operable to permit fluid flow and to trap bubbles in both directions described above with respect to arrows 140, 142, 144, 146, 148. Referring to FIGS. 1-4, 8-9, the cross symbol ("+") 194 represents a centroid of a sphere-shaped chamber 106. The closer the first and second surface openings 116, 122 are to the centroid 194 of a sphere-shaped chamber 106, the lower the fluid level required for bidirectional operation. The third conduit 150 is located farther from the centroid 194 and closer to the inner wall 108 than both the first and second surface openings 116, 122. Thus, when the first and second surface openings 116, 122 are located at or substantially at a centroid 194 of the chamber 106, omnidirectional operation can be achieved with the least amount of fluid 186 within the chamber 106. The least amount of fluid 186 is required when the first and second surface openings 116, 122 are aligned back-to-back with one another and each is aligned with the centroid 194.

Figures 10A, 10B:
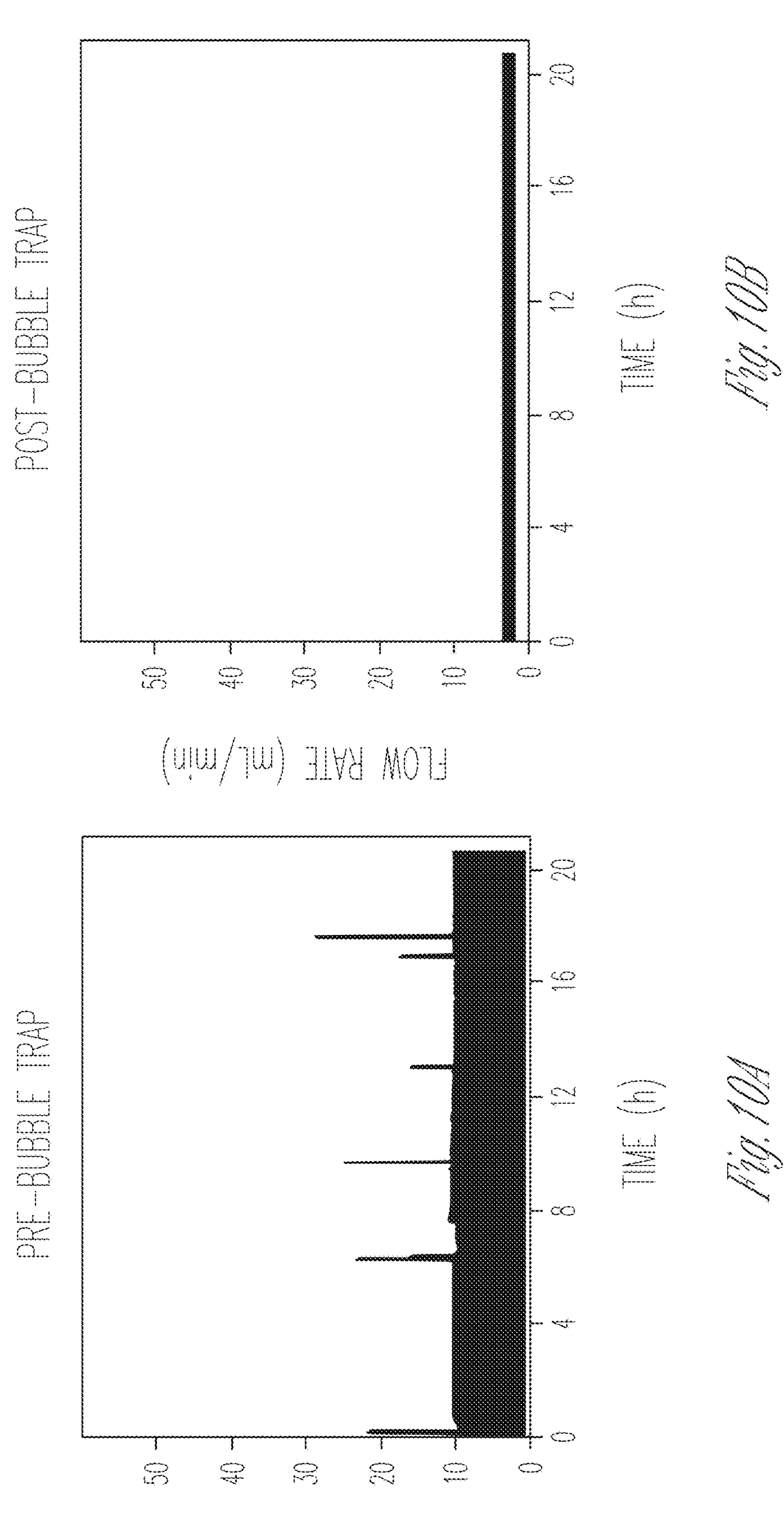
FIGS. 10A-10B are illustrative charts that show representative experimental data, plotting flow rate vs. time, using flow sensors placed in a fluid flow path immediately before (FIG. 10A) and after (FIG. 10B) a bubble trap device.

FIGS. 10A-10B are illustrative charts that show representative experimental data, plotting flow rate vs. time, using flow sensors placed in a fluid flow path immediately before (FIG. 10A) and after (FIG. 10B) a representative bubble trap 102. Flow was measured using thermal principles, and sharp spikes in the flow rate are indicative of air bubbles that flow past a sensor. Effectiveness of the bubble trap is evidenced by the dramatic attenuation of spikes after the bubble trap, for over 40 hours of continual flow. Liquid flow was driven by a piezoelectric micropump at 100 Hz operating frequency, and the corresponding oscillatory nature of the flow rate is manifested in a wide band of flow rate above and below the average of approximately 5 mL/min. Additionally, FIG. 10A-10B show that the bubble trap provides a flow dampening effect, by attenuating the oscillation by more than three-fold of the peak-to-peak amplitude.

Figure 11:
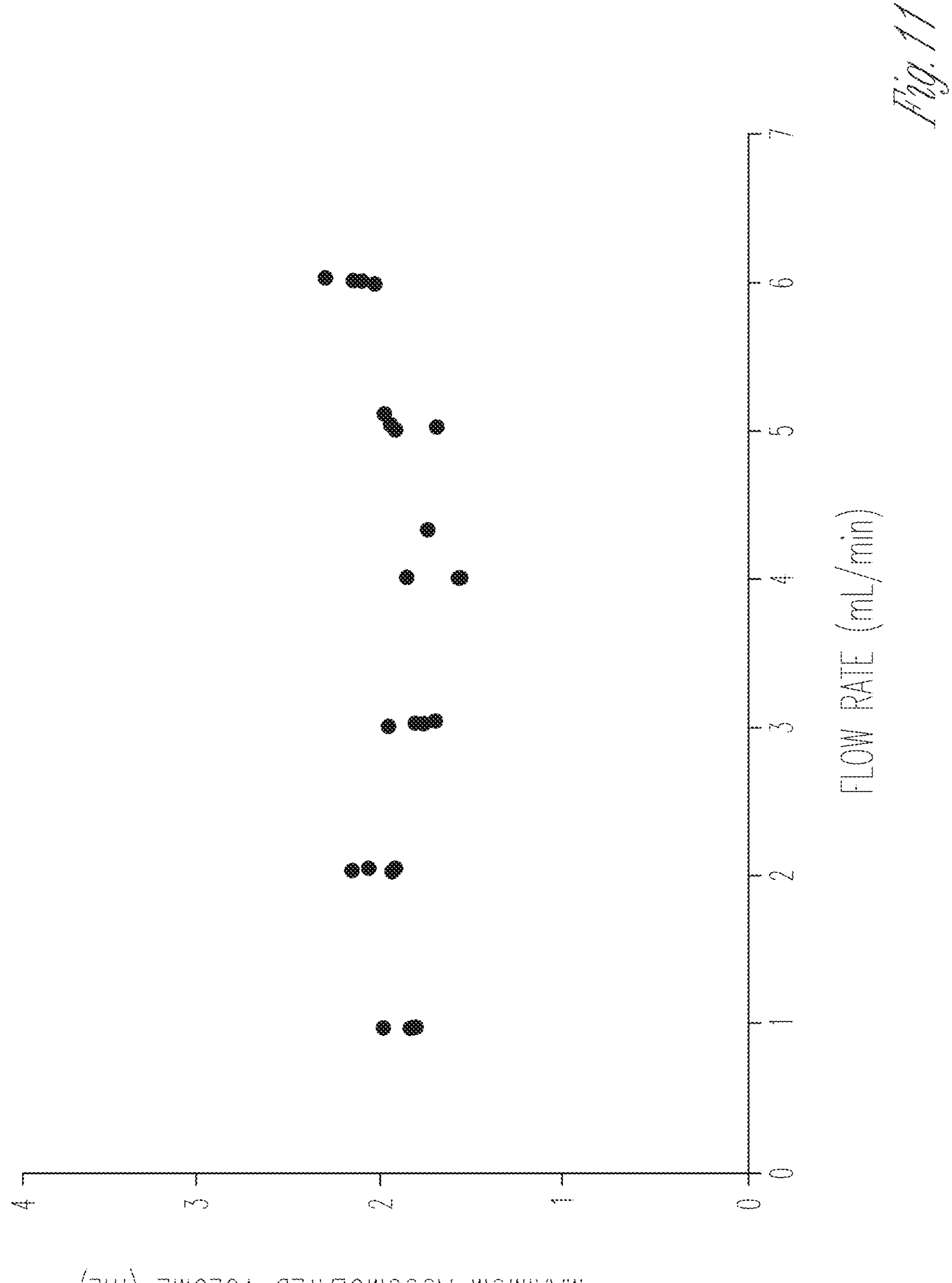
FIG. 11 is an illustrative chart that shows representative experimental data, plotting the maximum accumulated volume of air in the interior chamber as a function of combined liquid and air flow rate through a bubble trap device.

FIG. 11 is an illustrative chart that shows representative experimental data, plotting the maximum accumulated volume of air in the interior chamber 106 as a function of combined liquid and air flow rate through the device 102. Specifically, the data plots indicate the accumulated volume at which failure first occurs, defined as the instance when air that enters the chamber 106 through one of the external openings 127 or 129 and exits the chamber 106 through the other of the external openings 127 or 129. The chart of FIG. 11 shows that over a wide range of fluid flow rates between 1 mL/min and 6 mL/min, the maximum accumulated volume of air remains approximately constant at 2 mL. These data, performed with four replicate runs at each flow rate, show that a over six-fold difference in flow rate, effective performance of the device is limited only by initial sizing of the interior chamber 106.

The above description is presented to enable any person skilled in the art to create and use bubble trap device. Various modifications to the examples will be readily apparent to those skilled in the art, and the generic principles defined herein may be applied to other examples and applications without departing from the spirit and scope of the invention. For example, instead of defining a third conduit between a perimeter of the fluid guide and an inner wall of the chamber, an alternative embodiment third conduit (not shown) can be defined using one or more peripheral openings (not shown), formed in the first and second surfaces at one or more portions of the outer peripheral region of the fluid guide, to provide a fluid path between the first and second chamber regions. More particularly, it is contemplated that an alternative embodiment, instead of gap 502 between the inner wall 108 and the perimeter region 124, an alternative embodiment fluid guide (not shown) has one or more openings (not shown) that that are located at the perimeter region extend through the fluid guide to allow fluid to flow directly between the first and second first chamber portions 106-1, 106-2. In the preceding description, numerous details are set forth for the purpose of explanation. However, one of ordinary skill in the art will realize that the examples in the disclosure might be practiced without the use of these specific details. In other instances, well-known processes are shown in block diagram form in order not to obscure the description of the invention with unnecessary detail. Identical reference numerals are used in some places to represent different views of the same or similar items in different drawings. Thus, the foregoing description and drawings of embodiments and examples are merely illustrative of the principles of the invention. Therefore, it will be understood that various modifications can be made to the embodiments by those skilled in the art without departing from the spirit and scope of the invention, which is defined in the appended claims.

The invention claimed is:

1. A bubble trap device comprising:

a housing including an inner wall region defining a chamber to enclose a fluid;

a fluid guide that includes a first surface region and a second surface region that face in opposite directions from one another and that includes a perimeter region that substantially extends about the first surface region and the second surface region;

wherein the fluid guide is arranged within the chamber to separate the chamber into a first chamber region and a second chamber region with the first surface region facing the first chamber region and the second surface region facing the second chamber region;

a first fluid conduit located between the first and second surface regions and extending between a first opening in the inner wall region and a first surface opening located in the first surface region;

a second fluid conduit located between the first and second surface regions and extending between a second housing opening in the inner wall region and a second surface opening located in the second surface region;

one or more third fluid conduits located at the perimeter region and extending between the first chamber region and the second chamber region;

wherein the fluid guide has a contour to direct fluid flowing between the first fluid conduit and the second fluid conduit to flow through one or more of the one or more third fluid conduits.

2. The bubble trap device of claim 1, wherein the first surface region is substantially planar; and wherein the second surface region is substantially planar.

3. The bubble trap device of claim 1, wherein the fluid guide has a substantially circular contour.

4. The bubble trap device of claim 1, wherein one or more portions of the perimeter region are spaced apart from the inner wall region to define the one or more third fluid conduits.

5. The bubble trap device of claim 1, wherein the fluid guide is arranged within the chamber with one or more portions of the perimeter region spaced apart from the inner wall region to define the one or more third fluid conduits.

6. The bubble trap device of claim 1, wherein one or more openings that extend through the fluid guide at the perimeter region define the one or more third fluid conduits.

7. The bubble trap device of claim 5, wherein the inner wall region has a substantially spherical contour and has a first diameter; and wherein the fluid guide has a substantially circular contour and has a second diameter less than the first diameter.

8. The bubble trap device of claim 1, wherein the one or more third fluid conduits are located at one or more locations of the perimeter region to allow flow of fluid from the first chamber region to the second chamber region for substantially all orientations of the bubble trap device relative to a reverse gravitational direction, for fluid that flows into the first chamber region through the first surface opening and that flows along the first surface region in the reverse gravitational direction.

9. The bubble trap device of claim 8, wherein the one or more third fluid conduits are located at one or more locations of the perimeter region to allow flow of fluid from the second chamber region to the first chamber region for substantially all orientations of the bubble trap device relative to the reverse gravitational direction, for fluid that flows into the second chamber region through the second surface opening and that flows along the second surface region in the reverse gravitational direction.

10. The bubble trap of claim 1, wherein the fluid guide is substantially disk-shaped.

11. The bubble trap device of claim 1, wherein the chamber has a centroid; and wherein the one or more third fluid conduits are located substantially equidistant from the centroid.

12. The bubble trap device of claim 1, wherein the chamber has a centroid;

wherein the first surface opening and the second surface opening are located substantially equidistant from the centroid; and wherein the one or more third fluid conduits are located substantially equidistant from the centroid.

13. The bubble device of claim 1, wherein the fluid guide includes a first spoke-like conduit structure in which the first fluid conduit extends between the inner wall and the perimeter region; and wherein the fluid guide includes a second spoke-like conduit structure in which the second fluid conduit extends between the inner wall and the perimeter region.

14. The bubble device of claim 1, wherein the one or more third fluid conduits include a first gap between the inner wall and the perimeter region that extends between first sides of first and second spoke-like regions; and wherein the one or more third fluid conduits include a second gap between the inner wall and the perimeter region that extends between second sides of first and second spoke-like regions.

15. The bubble trap device of claim 1 further including:

a first external coupler defining a first external fluid conduit portion connected to an outer surface region of the housing to provide external fluid access to the first conduit; and a second external coupler defining a second external fluid conduit portion connected to the outer surface region of the housing to provide external fluid access to the second conduit.

16. The bubble trap of claim 15 further including:

a fluid access port defining a third fluid conduit portion connected to the outer surface region of the housing to provide fluid access to the chamber to add or to remove fluid from the chamber.

17. A bubble trap device comprising:

a housing including an inner wall region defining a chamber to enclose a fluid;

a fluid guide that includes a first surface region and a second surface region that face in opposite directions from one another and that includes a perimeter region;

wherein the fluid guide is arranged within the chamber to separate the chamber into a first chamber region and a second chamber region with the first surface region facing the first chamber region and the second surface region facing the second chamber region and with the perimeter region spaced apart from the inner wall region;

a first fluid conduit located between the first and second surface regions and extending between a first opening in the inner wall region and a first surface opening located in the first surface region;

a second fluid conduit located between the first and second surface regions and extending between a second housing opening in the inner wall region and a second surface opening located in the second surface region; and one or more third fluid conduits located at one or more locations of the perimeter region to allow flow of fluid between the first chamber region and the second chamber region for substantially all orientations of the bubble trap device relative to a reverse gravitational direction, for fluid that flows into one or the other of the first chamber region or the second chamber region through a corresponding one or the other of the first surface opening or the second surface opening and that flows along a corresponding one or the other of the first surface region or the second surface region in the reverse gravitational direction.

18. The bubble trap device of claim 17, further including:

first and second spoke-like structures to secure the fluid guide to the inner wall region.

19. The bubble trap device of claim 17, wherein the inner wall region defining the spherical chamber having a first diameter, and wherein the fluid guide has a generally circular disk-shaped and has a second diameter less than the first diameter.

20. The bubble trap device of claim 17, wherein the first surface region is substantially planar, and wherein the second surface region is substantially planar.

* * * * *